(12) United States Patent
Jeong et al.

(10) Patent No.: US 11,388,622 B2
(45) Date of Patent: Jul. 12, 2022

(54) TRAFFIC CONTROL DEVICE AND METHOD IN WIRELESS COMMUNICATION SYSTEM

(71) Applicant: Samsung Electronics Co., Ltd, Suwon-si (KR)

(72) Inventors: Jiwoong Jeong, Seoul (KR); Dong Hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 16/608,797

(22) PCT Filed: Apr. 24, 2018

(86) PCT No.: PCT/KR2018/004728
§ 371 (c)(1),
(2) Date: Oct. 25, 2019

(87) PCT Pub. No.: WO2018/199587
PCT Pub. Date: Nov. 1, 2018

(65) Prior Publication Data
US 2021/0105660 A1    Apr. 8, 2021

(30) Foreign Application Priority Data
Apr. 25, 2017  (KR) .......................... 10-2017-0052886

(51) Int. Cl.
*H04W 28/02* (2009.01)
*H04W 28/08* (2009.01)
(Continued)

(52) U.S. Cl.
CPC ....... *H04W 28/0289* (2013.01); *H04W 28/08* (2013.01); *H04W 48/18* (2013.01); *H04W 88/06* (2013.01)

(58) Field of Classification Search
None
See application file for complete search history.

(56) References Cited

U.S. PATENT DOCUMENTS

2012/0324100 A1* 12/2012 Tomici .............. H04W 28/0268
                                                          709/224
2014/0029420 A1    1/2014 Jeong et al.
(Continued)

FOREIGN PATENT DOCUMENTS

KR    10-2017-0020925 A    2/2017
WO       2016045739 A1     3/2016

OTHER PUBLICATIONS

Huawei, HiSilicon, "Non-3GPP Access Network Discovery and Selection", SAWG2 Meeting #119, S2-171141, 3 pages.
(Continued)

*Primary Examiner* — Mohammad S Adhami

(57) ABSTRACT

The disclosure relates to a 5th generation (5G) or pre-5G communication system for supporting a data transmission rate higher than that of a 4th generation (4G) communication system such as long term evolution (LTE). The purpose of the disclosure is to control traffic generally in a wireless communication system, and an operating method of a server comprises the steps of: receiving, from a network entity, information on a congested area in a network to which the network entity belongs; updating a network access policy on the basis of the received congested area information; and transmitting the updated network access policy to a terminal, wherein the network entity determines the congested area on the basis of statistical information on the network to which the network entity belongs.

4 Claims, 8 Drawing Sheets

(51) Int. Cl.
*H04W 48/18* (2009.01)
*H04W 88/06* (2009.01)

(56) References Cited

U.S. PATENT DOCUMENTS

| | | | |
|---|---|---|---|
| 2014/0086052 A1 | 3/2014 | Cai et al. | |
| 2015/0296427 A1 | 10/2015 | Lee et al. | |
| 2016/0029247 A1* | 1/2016 | Shan | H04L 5/005 370/235 |
| 2016/0135116 A1* | 5/2016 | Chen | H04W 48/20 455/450 |
| 2016/0262057 A1 | 9/2016 | Speicher et al. | |
| 2016/0269929 A1 | 9/2016 | Livanos et al. | |
| 2016/0309385 A1* | 10/2016 | Zhang | H04W 28/10 |
| 2017/0311198 A1* | 10/2017 | Monjas Llorente | H04W 28/08 |
| 2018/0098245 A1* | 4/2018 | Livanos | H04W 28/0289 |
| 2018/0192234 A1* | 7/2018 | Mohamed | H04L 67/12 |
| 2019/0014529 A1 | 1/2019 | Karampatsis et al. | |

OTHER PUBLICATIONS

"3rd Generation Partnership Project; Technical Specification Group Services and System Aspects; General Packet Radio Service (GPRS); Service description; Stage 2 (Release 14)", 3GPP TS 23.060 V14.1.0 (Sep. 2016), 366 pages.

"3rd Generation Partnership Project; Technical Specification Group Services and System Aspects; Network-Based IP Flow Mobility (NBIFOM); Stage 2 (Release 13)", 3GPP TS 23.161 V13.1.0 (Dec. 2015), 61 pages.

"3rd Generation Partnership Project; Technical Specification Group Services and System Aspects; Policy and charging control architecture (Release 14)", 3GPP TS 23.203 V14.1.0 (Sep. 2016), 253 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.1.0 (Sep. 2016), 378 pages.

"3rd Generation Partnership Project; Technical Specification Group Services and System Aspects; Architecture enhancements for non-3GPP accesses (Release 13)", 3GPP TS 23.402 V13.4.0 (Dec. 2015), 298 pages.

"3rd Generation Partnership Project; Technical Specification Group Core Network and Terminals; Access Network Discovery and Selection Function (ANDSF) Management Object (MO) (Release 13)", 3GPP TS 24.312 V13.1.0 (Dec. 2015), 385 pages.

"3rd Generation Partnership Project; Technical Specification Group Radio Access Network; User Equipment (UE) procedures in idle mode and procedures for cell reselection in connected mode (Release 13)", 3GPP TS 25.304 V13.0.0 (Dec. 2015), 58 pages.

"3rd Generation Partnership Project; Technical Specification Group Core Network and Terminals; Policy and Charging Control (PCC); Congestion reporting over Np reference point (Release 13)", 3GPP TS 29.217 V13.5.0 (Sep. 2016), 22 pages.

International Search Report dated Jul. 31, 2018 in connection with International Patent Application No. PCT/KR2018/004728, 2 pages.

Written Opinion of the International Searching Authority dated Jul. 31, 2018 in connection with International Patent Application No. PCT/KR2018/004728, 7 pages.

Notice of Preliminary Rejection dated Jun. 1, 2021, in connection with Korean Patent Application No. 10-2017-0052886, 19 pages.

Korean Intellectual Property Office, "Notice of Preliminary Rejection" dated Dec. 27, 2021, in connection with Korean Patent Application No. 10-2017-0052886, 9 pages.

Korean Intellectual Property Office, "Notice of Patent Grant" dated Apr. 5, 2022, in connection with Korean Patent Application No. 10-2017-0052886, 3 pages.

* cited by examiner

TRAFFIC CONTROL DEVICE AND METHOD IN WIRELESS COMMUNICATION SYSTEM

CROSS-REFERENCE TO RELATED APPLICATIONS

This application is a 371 of International Application No. PCT/KR2018/004728 filed on Apr. 24, 2018, which claims priority to Korean Patent Application No. 10-2017-0052886 filed on Apr. 25, 2017, the disclosures of which are herein incorporated by reference in their entirety.

BACKGROUND

1. Field

The disclosure relates to a wireless communication system and, more particularly, to an apparatus and a method for controlling traffic in a wireless communication system.

2. Description of Related Art

In order to meet wireless data traffic demands, which have increased since the commercialization of the 4th-generation (4G) communication system, efforts to develop an improved 5th-generation (5G) communication system or a pre-5G communication system have been made. For this reason, the 5G communication system or the pre-5G communication system is called a beyond-4G-network communication system or a post-LTE system.

In order to achieve a high data transmission rate, an implementation of the 5G communication system in a mmWave band (for example, 60 GHz band) is being considered. In the 5G communication system, technologies such as beamforming, massive MIMO, full dimensional MIMO (FD-MIMO), array antenna, analog beam-forming, and large-scale antenna technologies are being discussed as means to mitigate a propagation path loss in the ultrahigh-frequency band and increase a propagation transmission distance.

Further, technologies such as evolved small cell, advanced small cell, cloud radio access network (RAN), ultra-dense network, device-to-device communication (D2D), wireless backhaul, moving network, cooperative communication, coordinated multi-points (CoMP), and received interference cancellation have been developed in order to improve the system network in the 5G communication system.

In addition, the 5G system has developed advanced coding modulation (ACM) schemes such as hybrid FSK and QAM modulation (FQAM) and sliding window superposition coding (SWSC), and has further developed advanced access technologies such as filter bank multi carrier (FBMC), non orthogonal multiple access (NOMA), and sparse code multiple access (SCMA).

As technology of information communication has been developed and a wireless communication system has evolved, the use of data through wireless communication systems has increased. With the evolution of the wireless communication system, wireless networks by various radio access technologies (RATs) coexist in a current wireless communication environment. Particularly, terminals supporting a multi-mode/multi-band support access to different types of networks such as not only 4th generation (4G) long term evolution (LTE) network by the 3rd generation partnership (3GPP) standard but also Wi-Fi which is one type of wireless local area network (WLAN).

In order to control mobility of the terminal between different types of networks in the state in which different types of networks coexist, the 3GPP standard defines an access network discovery and select function (ANDSF). Through the ANDSF, a network access policy is configured by a network operator, and the terminal is controlled by transmitting the ANDSF access policy to the terminal. The ANDSF access policy may not reflect a dynamic network condition such as a traffic condition within the network and may simply distribute network traffic according to a network shape-based network operation policy by the operator.

SUMMARY

According to the above discussion, the disclosure provides an apparatus and a method for controlling traffic in a wireless communication system.

The disclosure provides an apparatus and a method for controlling traffic on the basis of information on a congested area of a network in a wireless communication system.

The disclosure provides an apparatus and a method for determining a network access policy of a terminal on the basis of information on a congested area of a network in a wireless communication system.

The disclosure provides an apparatus and a method for controlling a network access policy of the terminal in order to prevent traffic inflow to a congested area of a network in a wireless communication system.

The disclosure provides an apparatus and a method for updating a policy of an access network discovery and selection function (ANDSF) in order to control network traffic on the basis of network congested-area information shared by a radio access network (RAN) congestion awareness function (RCAF) in a wireless communication system.

In accordance with an aspect of the disclosure, a method of operating a server in a wireless communication system is provided. The method includes: receiving information on a congested area within a network to which a network entity belongs from the network entity; updating a network access policy, based on the received congested area information; and transmitting the updated network access policy to a terminal, wherein the network entity determines the congested area, based on statistical information of the network to which the network entity belongs.

In accordance with another aspect of the disclosure, an apparatus of a server in a wireless communication system is provided. The apparatus includes: a transceiver configured to receive information on a congested area within a network to which a network entity belongs from the network entity; and at least one processor configured to update a network access policy, based on the received congested area information, wherein the transceiver transmits the updated network access policy to a terminal, and the network entity determines the congested area, based on statistical information of the network to which the network entity belongs.

In accordance with another aspect of the disclosure, an apparatus of a terminal in a wireless communication system is provided. The apparatus includes: a transceiver configured to receive network access policy information from a server; and at least one processor configured to determine whether to access a found cell, based on the received network access policy and search for a new cell according to determination that the found cell is a cell which cannot be accessed by the received network access policy, wherein the network access policy is determined based on congested area information determined using statistical information of the network by a network entity within the network.

In accordance with another aspect of the disclosure, an apparatus of a network entity in a wireless communication system is provided. The apparatus includes: at least one processor configured to collect statistical information of a network to which the network entity belongs and determine a congested area, based on the collected statistical information; and a transceiver configured to transmit congested area information of the determined congested area to a server, wherein the congested area information is used to determine an access policy of a terminal for the congested area by the server.

An apparatus and a method according to various embodiments of the disclosure can efficiently use network resources by uniformly maintaining a network access policy of a terminal and fundamentally prevent terminal traffic inflow to a congested area by establishing a policy on the basis of congestion information of the network in a wireless environment in which different types of networks coexist. Accordingly, it is possible to distribute traffic and provide a stable wireless communication service to the terminal.

Effects which can be acquired by the disclosure are not limited to the above described effects, and other effects that have not been mentioned may be clearly understood by those skilled in the art from the following description.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to an apparatus and a method for controlling traffic in a wireless communication system. Specifically, the disclosure describes a technology for preventing access of a terminal to a congested area and traffic flow therein by sharing congested area information in a wireless communication system.

Terms (for example, ANDSF, RCAF, and RCRF) referring to network entities used in the following description, terms (for example, APN and IMSI) referring to control information, terms referring to elements of devices, and terms referring to communication technology are employed for convenience of description. Accordingly, the disclosure is not limited to the following terms and other terms having the same technical meaning may be used.

Further, although the disclosure describes various embodiments using a long-term evolution (LTE) system and an LTE-advanced (LTE-A) system, they are only examples for the description. Various embodiments of the disclosure may be easily modified and applied to other communication systems.

Figure 1:
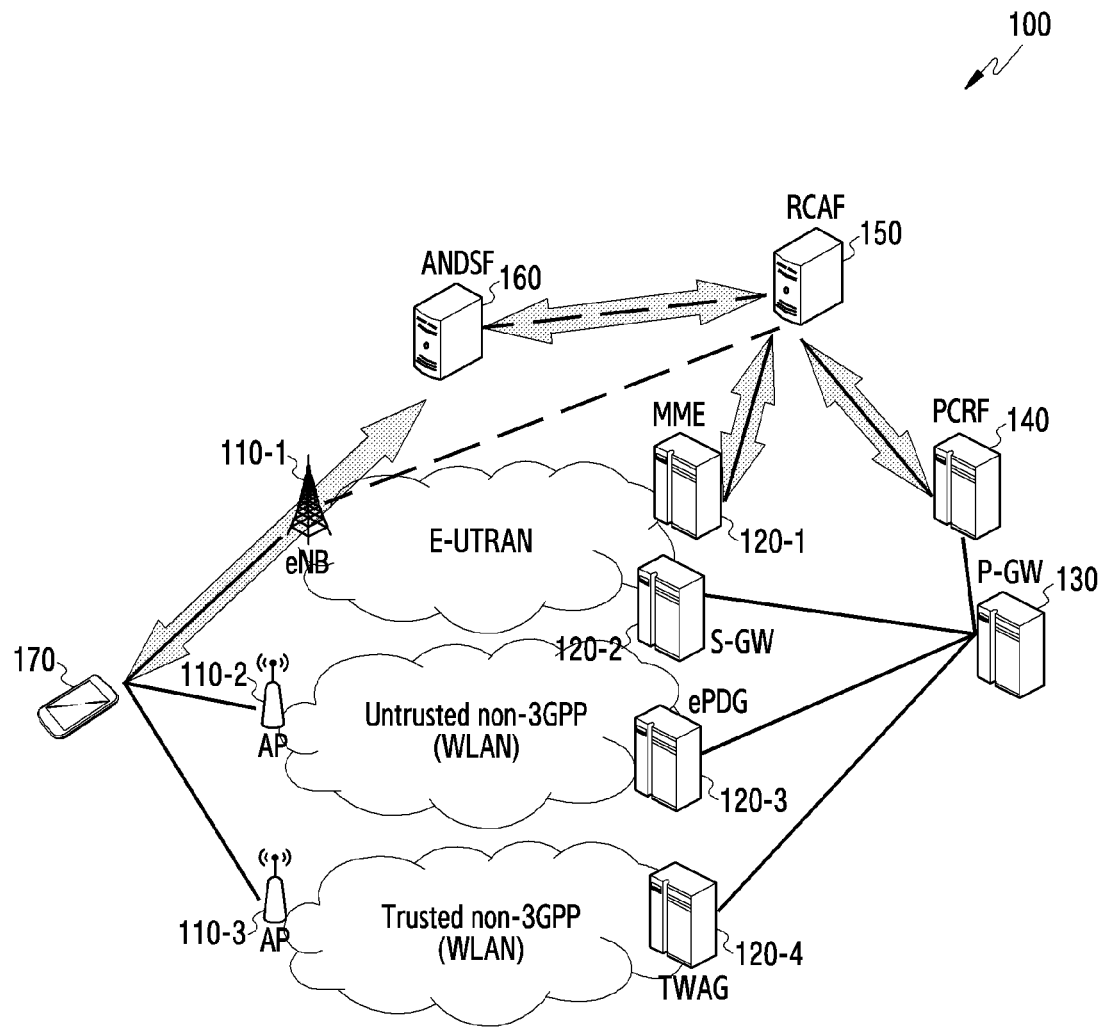
FIG. 1 illustrates a wireless communication system according to various embodiments of the disclosure.

FIG. 1 illustrates a wireless communication system according to various embodiments of the disclosure. Referring to FIG. 1, a system includes base stations 110-1 to 110-3, a mobility management entity (MME) 120-1, a signal-gateway (S-GW) 120-2, an evolved packet data gateway (ePDG) 120-3, a trusted WLAN access gateway 120-4, a packet data network gateway (P-GW) 130, a policy and charging rule function (PCRF) 140, a radio access network (RAN) congestion awareness function (RCAF) 150, an access network discovery and selection function (ANDSF) 160, and a terminal 170.

The base stations 110-1 to 110-3 provide radio access to the terminal 170. Each of the base stations 110-1 to 110-3 is one of entities configuring the access network and has coverage including a predetermined geographical range. The base stations 110-1 to 110-3 may be referred to as "access point (AP)", "evolved NodeB (eNB)", "5th generation (5G) node", "wireless point", "transmission/reception point (TRP)", or another term having an equivalent meaning thereto as well as "base station". According to an embodiment, the base station 110-1 may be an eNB, and the base stations 110-2 and 110-3 may be an AP. At this time, the base station 110-1 is an eNB configuring an evolved universal terrestrial radio access network (E-UTRAN) and may process data traffic between the terminal 170 and the core network S-GW 120-2. The base station 110-2 is an AP configuring an untrusted non-3GPP network, for example, a Wi-Fi (wireless fidelity) access network and may process data traffic between the terminal 170 and the core network ePDG 120-3. The base station 110-3 is an AP configuring a trusted non-3GPP network, for example, an AP configuring a WiFi or wireless broadband (WiBro) access network and may process data traffic between the terminal 170 and the TWAG 120-4.

The MME 120-1 controls signals between base station 110-1 and the S-GW 120-2. The MME 120-1 determines a place to which data from the terminal 170 is routed. The MME 120-1 manages mobility of the terminal 170 and controls handover. According to an embodiment, the MME 120-1 may be linked to the RCAF 150 and may search for international mobile subscriber identity (IMSI)/access point name (APN) information of an area in which congestion is generated and transmit the IMSI/APN information to the RCAF 150.

The S-GW 120-2 is a network entity for connecting the terminal 170 to an external network (for example, an internet protocol (IP) network) and may be linked to the base station 110-1. The S-GW 120-2 may provide the terminal 170 with the connection to the IP network via the P-GW 130. For example, the S-GW 120-2 may receive data from the terminal 170 by an S1 protocol via the base station 110-1 and transfer the received data to the IP network through the P-GW 130. The S-GW 120-2 may receive data from the IP network through the P-GW 130 and transmit the received data to the terminal 170 through the base station 110-1.

The ePDG 120-3 is a network entity for connecting the terminal 170 to the 3GPP core network via a wireless local area network (WLAN) and may be linked to the base station 110-2. The ePDG 120-3 may provide the terminal 170 with the connection to the IP network through the P-GW 130. For example, the ePDG 120-3 may receive data from the terminal 170 through the base station 110-2 and transfer the received data to the IP network through the P-GW 130. Further, the ePDG 120-3 may receive data from the IP network through the P-GW 130 and transmit the received data to the terminal 170 through the base station 110-2.

The TWAG 120-4 is a network entity for connecting the terminal 170 to the 3GPP core network via the WLAN and may be linked to the base station 110-3. The TWAG 120-4 may provide the terminal 170 with the connection to the IP network through the P-GW 130. For example, the TWAG 120-4 may receive data from the terminal 170 through the base station 110-3 and transfer the received data to the IP network through the P-GW 130. Further, the TWAG 120-4 may receive data from the IP network through the P-GW 130 and transmit the received data to the terminal 170 through the base station 110-3.

The P-GW 130 is a network entity for connecting the terminal 170 to an external network (for example, an internet protocol (IP) network) and may be linked to the S-GW 120-2. The P-GW 130 may provide the terminal 170 with the connection to the IP network through the P-GW 120-2. The P-GW 130 serves an anchor between the 3GPP network and the non-3GPP network. For example, the P-GW 130 may be linked to the terminal 170 through the base station 110-1 and the S-GW 120-2. The P-GW 130 may be linked to the terminal 170 through the ePDG 120-3 and the base station 110-2. Further, the P-GW 130 may be linked to the terminal 170 through the TWAG 120-4 and the base station 110-3. The P-GW 130 is linked to the PCRF 140 and apply a policy (rule) received from the PCRF 140. For example, the P-GW 130 may receive quality of service (QoS) and a charging policy from the PCRF 140, control QoS according thereto, and provide charging information.

The PCRF 140 is linked to the P-GW 130 and transmits policy information. For example, the PCRF 140 may transmit QoS and the charging policy to the P-GW 130, control QoS according thereto, and provide charging information. Further, the PCRF 140 may be linked to the RCAF 150 and control QoS and the charging policy. For example, the PCRF 140 receives congestion information through the RCAF 150 and an Np protocol and transfers a changed policy and charging control (PCC) rule to a system architecture evolution gateway (SAE GW).

The RCAF 150 is a network entity that provides a function of mitigating or avoiding congestion on the basis of RAN operations, administration, and management (OAM) in order to efficiently use available network resources. For example, the RCAF 150 is linked to an OAM of the base station 110-1 and collects statistical information from the OAM of the base station 110-1. The RCAF 150 determines whether congestion is generated on the basis of the collected statistical information. The RCAF 150 is linked to a Serving GPRN Support Node (SGSN) or an MME and, when congestion is detected, makes a request for IMSI/APN information of a congested area to the SGSN/MME. For example, the RCAF 150 may be linked to the MME 120-1, and may make a request for IMSI/APN of the congested area and receive IMS/APN information based on cell identity (ID)/tracking area identity (TAI) information of the congested area from the MME 120-1. The RCAF 150 is linked to the PCRF 140 and transmits congestion information. For example, when the congested area is detected, the RCAF 150 may collect IMSI/APN information from the MME 120-1 and transmit congestion information based on the corresponding information to the PCRF 140 to induce the RCRF 140 to change the PCC rule.

When the terminal 170 can use a plurality of access networks such as a 3GPP network through the base station 110-1 or a non-3GPP network through the base stations 110-2 and 110-3, the ANDSF 160 may indirectly control the access network by providing access network information to the terminal 170. For example, the ANDSF 160 may transmit access policy information to the terminal 170 in a push mode or a pull mode according to whether there is a request from the terminal 170. According to an embodiment, the ANDSF 160 may be linked to the RCAF 150. The ANDSF 160 may receive congested area information detected by the RCAF 150, update an access policy reflecting the corresponding information, and transmit the access policy to the terminal 170.

The terminal 170 is a user device and communicates with one of the base stations 110-1 to 110-3 through a radio channel. The terminal 170 may transmit and receive a packet for data communication with one of the base stations 110-1 to 110-3. Further, the terminal 170 may receive the access policy from the ANDSF 160. According an embodiment, the terminal 170 may determine whether a found cell belongs to the congested area according to the access policy received through the ANDSF 160, and when the cell belongs to the congested area, search for another cell. According to various embodiments, the terminal 170 may be a portable electronic device, or may be one of a smart phone, a portable terminal, a mobile phone, a mobile pad, a media player, a tablet computer, a handheld computer, and a personal digital assistant(PDA). According to other embodiments, the terminal 170 may be a stationary device. Further, the terminal 170 may be a device having a combination of two or more functions of the above-described devices.

Figure 2:
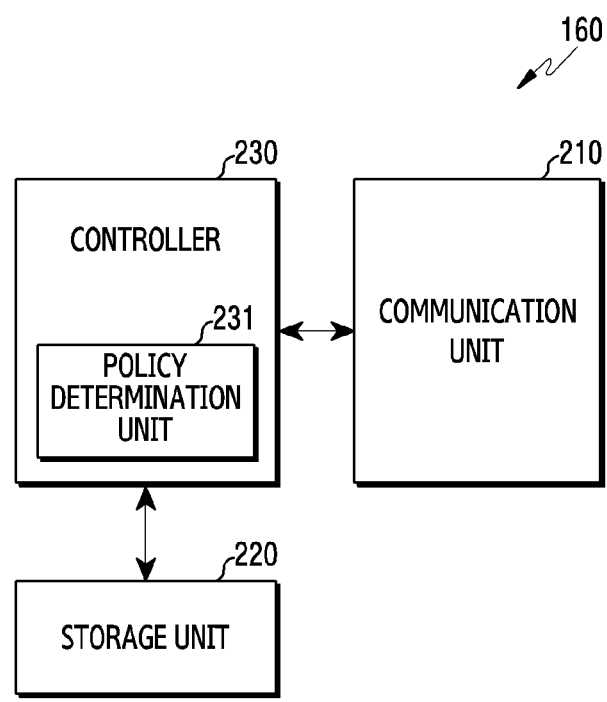
FIG. 2 is a block diagram illustrating a server in a wireless communication system according to various embodiments of the disclosure.

FIG. 2 is a block diagram illustrating a server in a wireless communication system according to various embodiments of the disclosure. FIG. 2 may be understood as the configuration of the ANDSF 160. However, while the conventional ANDSF in the 3GPP may uniformly configure an access policy by an operator regardless of a network condition, the server may dynamically configure an access policy on the basis of network information through a link with another network entity. The term "~unit" or "~er" used hereinafter may refer to the unit for processing at least one function or operation and may be implemented in hardware, software, or a combination of hardware and software. As illustrated in FIG. 2, the server includes a communication unit 210, a storage unit 220, and a controller 230.

The communication unit 210 provides an interface for transmitting and receiving signals to and from other nodes within the network. That is, the communication unit 210 converts a bitstream transmitted from the server to another node, for example, an access node, a base station, or a core network into a physical signal and converts a physical signal received from another node into a bitstream. For example, the communication unit 210 may convert a bitstream transmitted from the ANDSF 160 to the RCAF 150 into a physical signal and convert a physical signal received from the RCAF 150 into a bitstream.

The communication unit 210 transmits and receives the signal as described above. Accordingly, the communication unit 210 may be referred to as a "transmitter", a "receiver", or a "transceiver". Further, in the following description, transmission and reception of a signal performed through a communication interface is used as a meaning including the processing by the communication unit 210.

The storage unit 220 stores data such as a basic program, an application, and configuration information for the operation of the server. The storage unit 220 may be configured as volatile memory, non-volatile memory, or a combination of volatile memory and non-volatile memory. Further, the storage unit 220 provides stored data in response to a request from the controller 230.

The controller 230 controls the overall operation of the server. For example, the controller 230 transmits and receives a signal through the communication unit 210. Further, the controller 230 records data in the storage unit 220 and reads the recorded data. To this end, the controller 230 may include at least one of a processor and a microprocessor, or may be a part of the processor. The controller 230 determines an access policy using congested area information received by the ANDSF 160 according to various embodiments described below. To this end, the controller 230 may include a policy determination unit 231. The policy determination unit 231 is an instruction set or code stored in the storage unit 230, and may be instructions/code residing at least temporarily in the controller 230, a storage space that stores the instructions/code, or part of the circuitry included in the controller 230. For example, the controller 230 controls the server to perform a procedure according to various embodiments described below.

According to another embodiment, the block diagram of the server may be understood as the configuration of the RCAF 150. In this case, the RCAF 150 may be understood as an element including blocks except for the policy determination unit 231.

Figure 3:
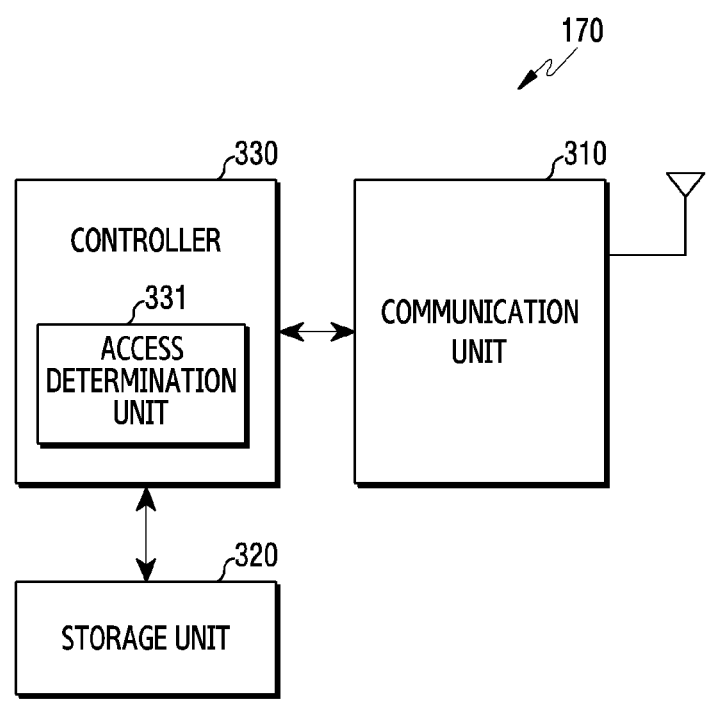
FIG. 3 is a block diagram illustrating a terminal in a wireless communication system according to various embodiments of the disclosure.

FIG. 3 is a block diagram illustrating a terminal in a wireless communication system according to various embodiments of the disclosure. The configuration illustrated in FIG. 3 may be understood as the configuration of the terminal 170. The term "~unit" or "~er" used hereinafter may refer to the unit for processing at least one function or operation and may be implemented in hardware, software, or a combination of hardware and software.

Referring to FIG. 3, the terminal 170 includes a communication unit 310, a storage unit 320, and a controller 330.

The communication unit 310 performs functions for transmitting/receiving a signal through a wireless channel. For example, the communication unit 310 performs a function of conversion between a baseband signal and a bit stream according to a physical layer standard of the system. For example, when data is transmitted, the communication unit 310 generates complex symbols by encoding and modulating a transmission bit stream. When data is received, the communication unit 310 restores a reception bit stream by demodulating and decoding a baseband signal. The wireless communication unit 310 up-converts a baseband signal into a RF band signal and transmits the same through an antenna, and down-converts an RF band signal received through an antenna into a baseband signal.

To this end, the communication unit 310 may include a transmission filter, a reception filter, an amplifier, a mixer, an oscillator, a digital-to-analog convertor (DAC), an analog-to-digital convertor (ADC), and the like. Further, the communication unit 310 may include a plurality of transmission/reception paths. In addition, the communication unit 310 may include at least one antenna array including a plurality of antenna elements. On the hardware side, the communication unit 310 may include a digital circuit and an analog circuit (for example, a radio frequency integrated circuit: RFIC). The digital circuit and the analog circuit may be implemented as one package. The communication unit 310 may include a plurality of RF chains. The communication unit 310 may perform beamforming.

The communication unit 310 transmits and receives the signal as described above. Accordingly, the communication unit 310 may be referred to as a "transmitter", a "receiver", or a "transceiver". In the following description, transmission and reception performed through a radio channel may be understood as a meaning including the processing performed by the communication unit 310.

The storage unit 320 stores data such as a basic program, an application program, and configuration information for the operation of the terminal 170. The storage unit 320 may be configured as volatile memory, non-volatile memory, or a combination of volatile memory and non-volatile memory. Further, the storage unit 320 provides stored data in response to a request from the controller 330.

The controller 330 controls the overall operation of the terminal 170. For example, the controller 330 transmits and receives a signal through the communication unit 310. The controller 330 records data in the storage unit 320 and reads the recorded data. To this end, the controller 330 may include at least one processor or microprocessor, or may play the part of the processor. Further, the part of the communication unit 310 or the controller 330 may be referred to as a communication processor (CP). Particularly, the controller 330 determines whether the terminal 170 accesses a found cell on the basis of the access policy received from the ANDSF 160 according to various embodiments described below. To this end, the controller 330 may include an access determination unit 331. The access determination unit 331 is an instruction set or code stored in the storage unit 330, and may be instructions/code residing at least temporarily in the controller 330, a storage space that stores the instructions/code, or part of the circuitry included in the controller 230. For example, the controller 330 controls the terminal 170 to perform a procedure according to various embodiments described below.

A network entity for mitigating or avoiding congestion is needed to efficiently use available network resources in a wireless communication system. According to various embodiments of the disclosure, a procedure for controlling an access policy of the terminal in order to detect a congested area and avoid the congested area may be performed as illustrated in FIGS. 4 to 8.

Figure 4:
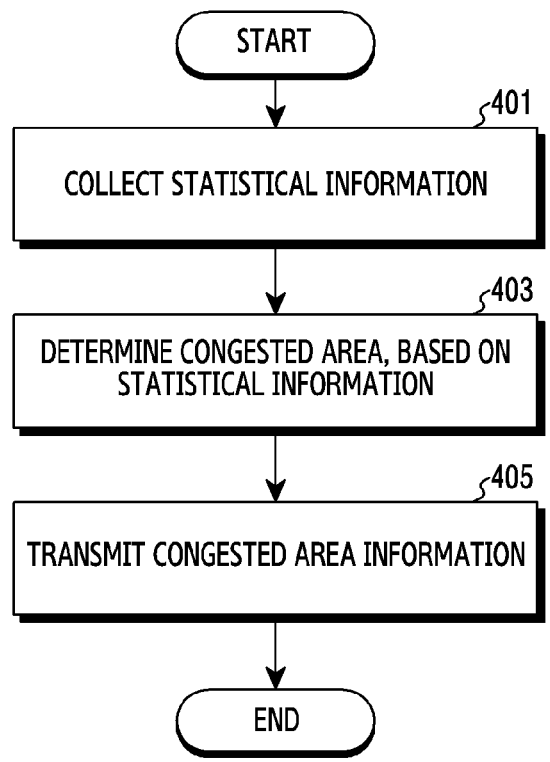
FIG. 4 illustrates a method of operating a server for determining a congested area and transmitting congested area information in a wireless communication system according to various embodiments of the disclosure.

FIG. 4 illustrates a method of operating a server for determining a congested area and transmitting congested area information in a wireless communication system according to various embodiments of the disclosure. FIG. 4 illustrates a method of operating the server for detecting a congested area. For example, the server may be the RCAF 150.

Referring to FIG. 4, in step 401, the server collects statistical information. That is, the server receives statistical information of traffic in a radio access node. According to an embodiment, the RCAF 150 may receive statistical information of traffic such as a number of attempts of access to each cell from an RAN OAM of the base station 110-1 included in the E-UTRAN. Statistical information collected from the RAN OAM may vary depending on the configuration.

Thereafter, in step 403, the server determines a congested area on the basis of the received statistical information. That is, the server detects congestion of a specific area on the basis of the received statistical information. According to an embodiment, the RCAF 150 may determine that the specific cell is the area in which congestion is generated on the basis of statistical information of traffic collected from the RAN OAM. At this time, the RCAF 150 may compare a value calculated by the collected statistical information of traffic with a reference value, and when the calculated value is larger than or equal to the reference value, determine that the corresponding area is the congested area.

Since a traffic control/traffic offloading policy is independently defined by the RCAF and the ANDSF in the current 3GPP standard, the RCAF 150 transmits an IMSI/APN information request message for the congested area to the SGSN/MME if congestion is detected. Thereafter, the RCAF 150 receives IMSI/APN information which the SGSN/MME found on the basis of cell ID and TAI information included in the request message. The RCAF 150 may transmit an RAN congestion information report (RAN User plane congestion information (RUCI) report) message to the PCRF 140 on the basis of the received IMSI/APN information and congested area information, and the PCRF 140 may limit a bandwidth parameter or change a PCC rule in order to mitigate congestion on the basis of the received information.

As described above, an interface for sharing the congested area information between the RCAF and the ANDSF is not defined in the current 3GPP standard. Further, the ANDSF does not define an interface for linking with another network entity except for the terminal. However, the ANDSF and the RCAF influence traffic characteristics by limiting a bandwidth of traffic flow of the terminal or offloading traffic from a 3GPP network to a non-3GPP network or from a non-3GPP network to a 3GPP network. The ANDSF and the RCAF mutually influence policies of each other, and thus establishment of independent policies of respective network entities may cause the inefficient use of network resources or create a problem such as service disconnection due to an unnecessary handover operation of important service traffic between different types of networks.

Accordingly, the disclosure proposes a new interface for sharing information on a traffic-congested area within a 3GPP network between the RCAF and the ANDSF.

In step 405, the server transmits congested area information. That is, the server transmits information on a cell detected as the congested area to another network entity. According to an embodiment, the RCAF 150 may transmit ID information of the cell within the 3GPP network detected as the congested area to the ANDSF 160. At this time, the cell ID information may include at least one of an E-UTRA cell ID, a UTRAN cell ID, a GSM EDGE radio access network (GERAN) cell ID, and tracking area code (TAC) information.

Figure 5:
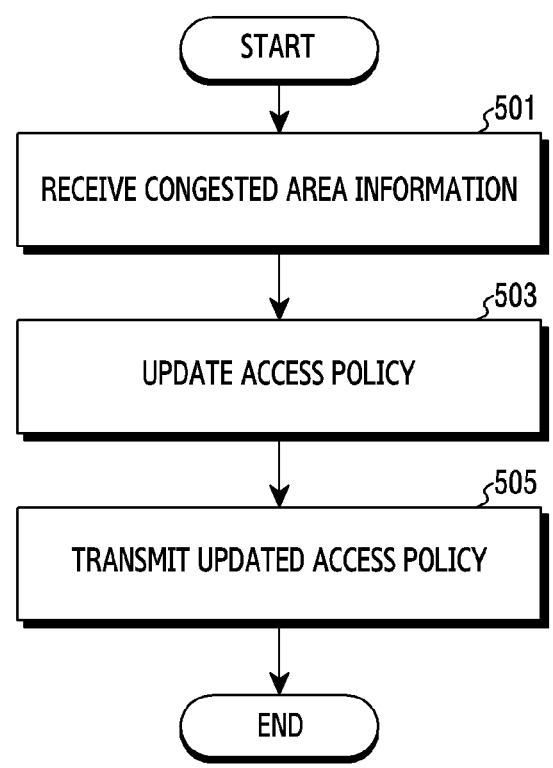
FIG. 5 illustrates a method of operating a server for transmitting an access policy in a wireless communication system according to various embodiments of the disclosure.

FIG. 5 illustrates a method of operating a server for transmitting an access policy in a wireless communication system according to various embodiments of the disclosure. FIG. 5 illustrates a method of operating the server for receiving congested area information from another network entity and transmitting an updated access policy to a terminal. For example, the server may be the ANDSF 160.

Referring to FIG. 5, in step 501, the server receives congested area information. That is, the server receives information on a congested area from another network entity. According to an embodiment, the ANDSF 160 may receive information on the congested area from the RCAF 150 for determining the congested area within the 3GPP network. The information on the congested area may include ID information of the cell within the corresponding network.

Thereafter, in step 503, the server updates the access policy on the basis of the received congested area information. That is, the server determines the access policy of the terminal on the basis of congested area information received from another network entity. According to an embodiment, the ANDSF 160 receives congested area information including ID information of a specific ell determined as the congested area from the RCAF 150 and updates the access policy on the basis of the received cell ID information. At this time, the ANDSF 160 may configure the access policy such that the terminal cannot access the cell ID corresponding to the congested area.

In step 505, the server transmits the updated access policy to the terminal. That is, the server transmits the determined access policy reflecting the congested area information to the terminal. According to an embodiment, the ANDSF 160 may transmit the determined access policy to prevent the terminal from accessing the cell ID corresponding to the congested area to the terminal 170. The terminal 170 may attempt access to areas except for the congested area of the 3GPP network according to the received access policy.

Figure 6:
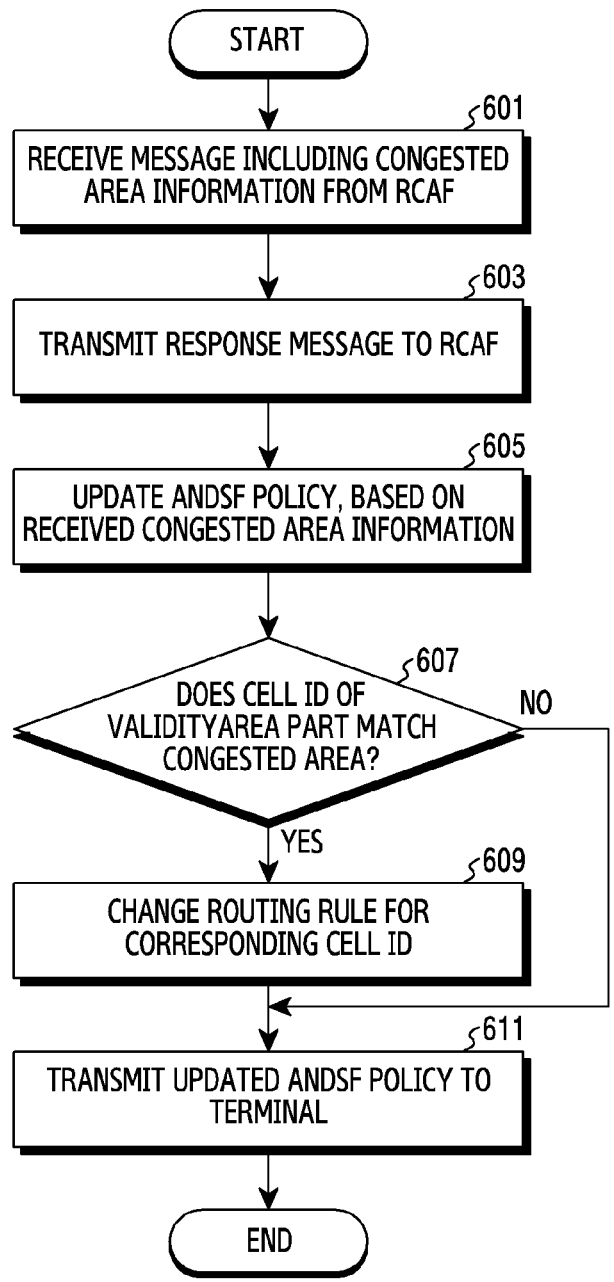
FIG. 6 illustrates a detailed method of operating a server for updating and transmitting an access policy in a wireless communication system according to various embodiments of the disclosure.

FIG. 6 illustrates a detailed method of operating a server for updating and transmitting an access policy in a wireless communication system according to various embodiments of the disclosure. For example, the server may be the ANDSF 160.

Referring to FIG. 6, in step 601, the server receives a message including congested area information from the RCAF. According to an embodiment, the ANDSF 160 may receive a message including information on the congested area from the RCAF 150 for determining the congested area within the 3GPP network. At this time, the information on the congested area included in the message may include at least one of cell ID information within the 3GPP detected by the RCAF 150, for example, an E-UTRA cell ID, a UTRAN cell ID, a GERAN cell ID, and TAC information. According to an embodiment, the message received from the RCAF 150 may be a congested area (location) report message, and the congested area (location) report message may include cell ID information within the 3GPP.

Thereafter, in step 603, the server transmits a response message to the RCAF. According to an embodiment, the ANDSF 160 may receive a message including information on the congested area from the RCAF 150 and transmit a response message in response thereto. At this time, the response message transmitted to the RCAF 150 may be a congested area (location) response (acknowledgement) message.

In step 605, the server updates the policy on the basis of the received congested area information. According to an embodiment, the ANDSF 160 receives congested area information including ID information of a specific ell determined as the congested area from the RCAF 150 and updates the ANDSF policy on the basis of the received cell ID information. At this time, the ANDSF 160 may determine the access policy to prevent the terminal from being access the cell ID corresponding to the congested area, for example, an E-UTRA cell ID, a UTRAN cell ID, a GERAN cell ID, and TAC.

In step 607, the server determines whether a cell ID of a specific field in the policy matches the congested area. According to an embodiment, the ANDSF 160 may check a cell ID of a ValidityArea part in the ANDSF policy and determine whether the cell ID matches the cell ID corresponding to the congested area.

When the cell IDs match each other, the server changes a routing policy (rule) of the corresponding policy in step 609. According to an embodiment, the ANDSF 160 may update the ANDSF policy by changing routing policy (rule) information of the ANDSF policy that matches the cell ID corresponding to the congested area to prevent the terminal from accessing the cell ID corresponding to the congested area. According to another embodiment, the ANDSF 160 may configure an access priority of the ANDSF policy that matches the cell ID corresponding to the congested area to be low or configure the access to be prohibited.

When the cell IDs do not match, the server proceeds to step 611 without any change in the routing policy.

Thereafter, in step 611, the server transmits updated policy information to the terminal. According to an embodiment, the ANDSF 160 may induce the terminal to access the network while avoiding the contested area on the basis of the updated policy information by transmitting the updated ANDSF policy information to the terminal through the above-described steps.

Figure 7:
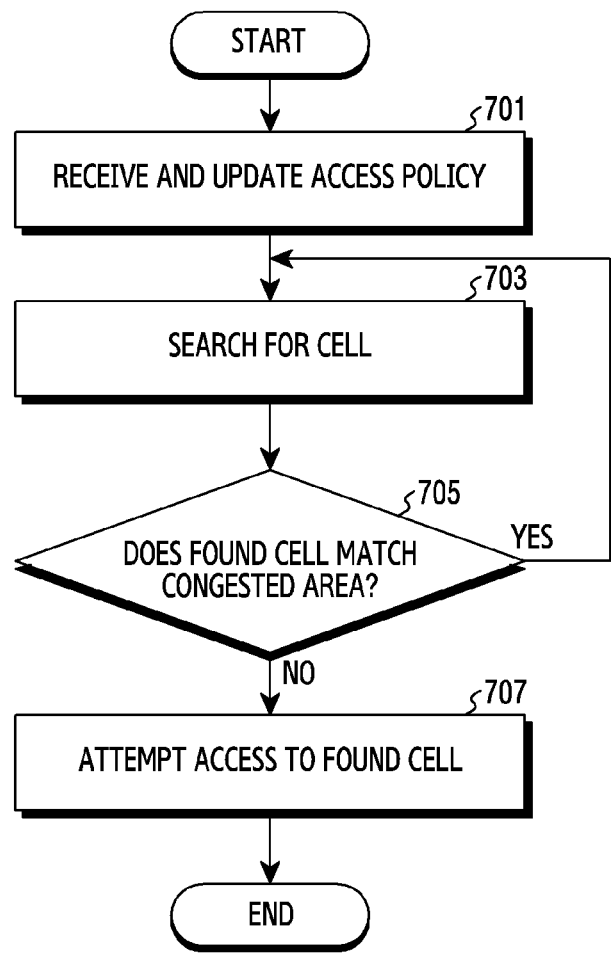
FIG. 7 illustrates a method of operating a terminal for receiving congested area information in a wireless communication system according to various embodiments of the disclosure.

FIG. 7 illustrates a method of operating a terminal for receiving congested area information in a wireless communication system according to various embodiments of the disclosure. For example, FIG. 7 illustrates the terminal 170.

Referring to FIG. 7, in step 701, the terminal may receive an access policy from a server and update the access policy of the terminal. According to an embodiment, the terminal 170 may receive updated access policy reflecting congested area information from the ANDSF 160. The terminal 170 may receive the access policy from the ANDSF 160 in a pull mode (UE-initiated session) in the case of transmission of the access policy by a request from the terminal 170, and receive the access policy in a push mode (ANDSF-initiated session) in the case other than the transmission by the request from the terminal 170. According to an embodiment, the received access policy information may include an inter-system mobility policy (ISMP), an inter-system routing policy (ISRP), an inter-APN routing policy (IARP), and a WLAN selection policy (WLANSP).

Thereafter, in step 703, the terminal searches for a cell. According to an embodiment, that is, the terminal 170 may scan for an access network through a frequency search.

In step 705, the terminal determines whether the found cell matches the congested area. According to an embodiment, the terminal 170 may determine whether the cell ID found on the basis of the access policy received from the ANDSF 160 matches the cell ID of the congested area and thus the area is an area in which access is restricted. According to another embodiment, the terminal 170 may determine whether the cell ID found on the basis of the access policy received from the ANDSF 160 is included in the routing policy and thus the area is an accessible area. That is, the terminal 170 may determine whether a priority of access to the corresponding cell ID is low or the access is prohibited according to a routing rule for the cell ID that matches the found cell ID.

When the found cell matches the congested area and thus access to the corresponding cell is not possible according to the access policy, the terminal 170 returns to step 703 and continues to search for a cell. According to another embodiment, when a routing rule for the selected cell has a low access priority or when the access is prohibited after the cell search is completed, the terminal 170 selects another cell and repeats a process of identifying the routing rule.

When the found cell does not match the congested area and thus access to the corresponding cell is possible according to the access policy, the terminal attempts access to the found cell in step 707. According to an embodiment, when a routing rule of the found cell has a high access priority or when the access is not prohibited in step 705, the terminal 170 may transmit a message of attempting access to the found cell according to the corresponding routing rule.

According to other embodiments, the terminal 170 supports a multiple access connectivity (MAPCON) operation, an IP flow mobility (IFOM)/network based ip flow mobility (NBIFOM) operation, and a non-seamless wlan offloading (NSWO) operation on the basis of the policy provided from the ANDSF 160. In such an operation, the terminal 170 may avoid access to the congested cell on the basis of the policy information reflecting the congested area information provided by the ANDSF 160.

Figure 8:
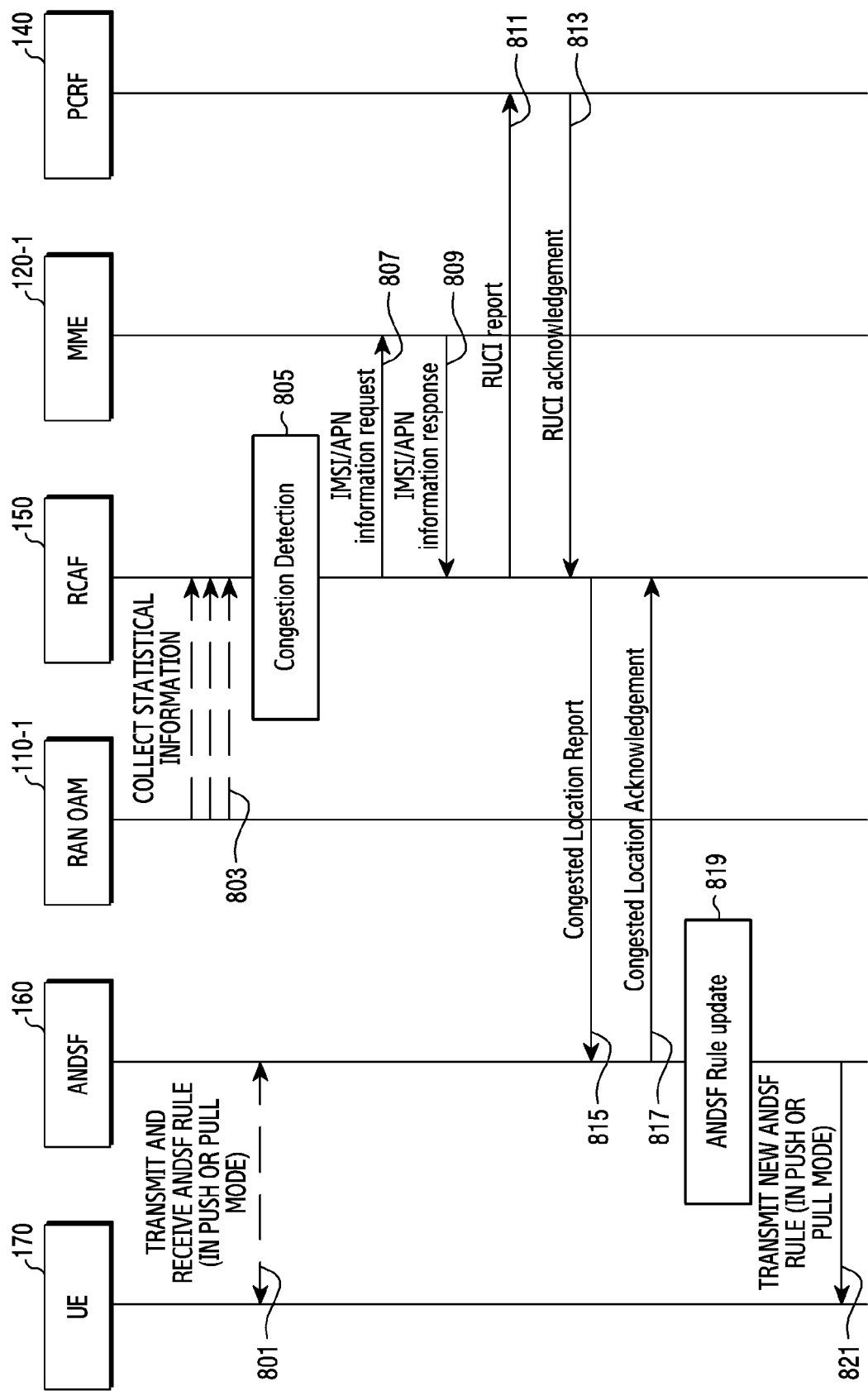
FIG. 8 illustrates an operation method of sharing congestion information between network entities in a wireless communication system according to various embodiments of the disclosure.

FIG. 8 illustrates an operation method of sharing congestion information between network entities in a wireless communication system according to various embodiments of the disclosure. According to an embodiment, FIG. 8 illustrates flow of messages between the terminal 170, the ANDSF 160, a RAN OAM of the base station 110-1, the RCAF 150, the MME 120-1, and the PCRF 140 for sharing congested area information.

Referring to FIG. 8, in step 801, the terminal 170 and the ANDSF 160 may transmit and receive an ANDSF policy. The ANDSF 160 provides a policy of an available access network such that the terminal 170 accesses and selects the access network. The ANDSF policy information which the ANDSF 160 provides to the terminal 170 may include ISMP, ISRP, TARP, and WLANSP information. When the terminal 170 is able to use a plurality of access networks such as the 3GPP network or the non-3GPP network, the ANDSF 160 may provide network information so as to indirectly control the access networks. The network control may have a traffic steering effect between the 3GPP network and a WLAN offload network.

According to an embodiment, information may be transmitted and received between the terminal 170 and the ANDSF 160 through an OMA-DM protocol on an S14 interface. Further, transmission of the information may be performed in a pull mode or a push mode in which the ANDSF 160 transmits policy information in response to a request from the terminal 170. When the terminal 170 roams a visited-public land mobile network (V-PLMN), the terminal may determine an access network on the basis of information received from a visited-ANDSF (V-ANDSF) and information received from a home-ANDSF (H-ANDSF).

In step 803, the RCAF 150 may receive statistical information of traffic such as a number of attempts of access to each cell from the RAN OAM of the base station 110-1 included in the E-UTRAN. Statistical information collected from the RAN OAM may vary depending on the configuration.

Thereafter, in step 805, the RCAF 150 may determine that a specific cell is an area in which congestion is generated on the basis of the statistical information of traffic collected from the RAN OAM of the base station 110-1. At this time, the RCAF 150 may compare a value calculated by the collected statistical information of traffic with a reference value, and when the calculated value is larger than or equal to the reference value, determine that the corresponding area is the congestion area.

In step 807, when congestion is detected, the RCAF 150 transmits an IMSI/APN information request message of the congested area to the MME 120-1. According to another embodiment, the RCAF 150 may transmit the corresponding IMSI/APN information request message to the SGSN. At this time, the IMSI/APN information request message transmitted by the RACF 150 may include ID/TAI information of the cell in which congestion is generated. According to the 3GPP standard, an interface between the RCAF 150 and the MME 120-1 may transmit and receive a message by an Nq protocol.

In step 809, the MME 120-1 finds IMSI/APN information on the basis of the cell ID and TAI information included in the IMSI/APN information request message received from the RCAF 150. The MME 120-1 inserts IMSI and APN information corresponding to the cell ID and TAI information into a response message and transmits the response message to the RCAF 150.

Thereafter, in step 811, the RCAF 150 transmits a RAN congestion information (RUCI) report message to the PCRF 140 on the basis of the collected RAN OAM information and the IMSI/APN information received from the MME 120-1. According to the 3GPP standard, an interface between the RCAF 150 and the PCRF 140 may transmit and receive a message by an Np protocol.

In step 813, the PCRF 140 receiving the congestion information transmits a RAN congestion information response (RUCI acknowledgement) message to the RCAF 150. The PCRF 140 controls and mitigates congestion within the 3GPP network by establishing a new PCC rule on the basis of the received information. The PCRF 140 may support an operation for mitigating/controlling congestion through functions such as a service/application gating function, a service/application bandwidth limitation function, and a function of deferring services. To this end, the PCRF 140 may change the PCC rule to limit a bandwidth parameter or an application function (AF) request service.

Thereafter, in step 815, the RCAF 150 transmits ID information of the cell within the 3GPP network detected as the congested area. At this time, the cell ID information may include at least one of an E-UTRA cell ID, a UTRAN cell ID, a GERAN cell ID, and TAC information. A message through which the RCAF 150 transmits the ID of the congested cell within the 3GPP network may be defined as a contested area (location) report message.

In step 817, the ANDSF 160 transmits a response message of the received congested area report message to the RCAF 150. The response message of the message including the information on the ID of the congested cell within the 3GPP network which the ANDSF 160 receives from the RCAF 150 may be defined as a contested area (location) response (acknowledgement) message.

Thereafter, in step 819, the ANDSF 160 receives congested area information including ID information of a specific ell determined as the congested area from the RCAF 150 and updates the ANDSF policy on the basis of the received cell ID information. The ANDSF 160 may determine the access policy to prevent the terminal from being access the cell ID corresponding to the congestion area, for example, an E-UTRA cell ID, a UTRAN cell ID, a GERAN cell ID, and TAC. At this time, the ANDSF 160 may check a cell ID of a ValidityArea part in the ANDSF policy, determine whether the checked cell ID matches the cell ID corresponding to the congested area, and change routing policy information of the matching ANDSF policy to prevent the terminal from accessing the cell ID corresponding to the congested area, so as to update the ANDSF policy.

Thereafter, in step 821, the ANDSF 160 transmits the updated ANDSF policy information to the terminal 170 through the above-described steps. Accordingly, the terminal 170 may be induced to access the network while avoiding the congested area on the basis of the updated policy. According to an embodiment, when the ANDSF policy updated on the basis of the contested area information is transmitted, the ANDSF 160 may start a session and transmits a new ANDSF policy in a push mode without a request from the terminal 170 or may start a session and transmit a new ANDSF policy in a pull mode when the terminal 170 makes a request. The terminal 170 may avoid accessing a congested cell on basis of policy information reflecting congested area information provided by the ANDSF 160.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. An access network discovery and selection function (ANDSF) in a wireless communication system, the ANDSF comprising:
    a transceiver; and
    at least one processor, wherein the at least one processor is configured to:
        receive, from a radio access network (RAN) congestion awareness function (RCAF), information on a congested area within a network of the RCAF, wherein the information on the congested area includes identity (ID) of a congested cell within the network of the RCAF;
        update an ANDSF policy, based on the received congested area information;
        identify whether a cell ID of a validity area part of the ANDSF policy corresponds to the ID of the congested cell;
        in case that the cell ID of a validity area part of the ANDSF policy does not correspond to the ID of the congested cell, transmit, to a terminal, the updated ANDSF policy without updating a routing policy of the ANDSF policy; and
        in case that the cell ID of a validity area part of the ANDSF policy corresponds to the ID of the congested cell:
            update the routing policy to prevent the terminal from accessing the congested cell based on the ID of the congested cell, and
            transmit, to the terminal, the updated ANDSF policy based on the updated routing policy,
    wherein the information on the congested area is generated based on statistical information of the network of the RCAF,
    wherein the information on the congested area is transmitted from the RCAF after requesting access point name (APN) information of the congested area and a RAN congestion information (RUCI) report, and
    wherein the statistical information is transmitted from a RAN operations, administration and management (OAM).

2. The ANDSF of claim 1, wherein the at least one processor is configured to transmit the updated ANDSF policy in a push mode by a session initiated by the ANDSF without a request from the terminal or in a pull mode by a request from the terminal.

3. A radio access network (RAN) congestion awareness function (RCAF) in a wireless communication system, the RCAF comprising:
    a transceiver; and
    at least one processor,
    wherein the at least one processor is configured to:
        receive, from a RAN operations, administration and management (OAM) statistical information of a network of the RCAF;
        identify a congested area based on the received statistical information;
        transmit, to a mobility management entity (MME), a message requesting access point name (APN) information of the identified congested area, wherein information on the identified congested area includes identity (ID) of a congested cell within the network of the RCAF;
        receive, from the MME, a message including the APN information of the identified congested area;
        transmit, to a policy and charging rule function (PCRF), a RAN congestion information (RUCI) report message comprising the identified congested area and the APN information of the identified congested area;
        receive, from the PCRF, a RUCI response message; and
        transmit, to an access network discovery and selection function (ANDSF), congested area information of the identified congested area,
    wherein the congested area information is used to determine an ANDSF policy for a terminal for the congested area by the ANDSF,
    wherein, in case that a cell ID of a validity area part of the ANDSF policy does not correspond to the ID of the congested cell, the ANDSF policy is updated without updating a routing policy of the ANDSF policy, and
    wherein, in case that the cell ID of a validity area part of the ANDSF policy corresponds to the ID of the congested cell, based on the ID of the congested cell, the routing policy of the ANDSF policy is updated to prevent the terminal from accessing the congested cell.

4. The ANDSF of claim 1 wherein ID information of the congested cell within the network comprises at least one of an evolved-universal terrestrial radio access (E-UTRA) cell ID, a universal terrestrial radio access network (UTRAN) cell ID, a GSM EDGE radio access network (GERAN) cell ID, and tracking area code (TAC) information.

* * * * *